United States Patent
Delannoy et al.

(10) Patent No.: US 12,429,885 B2
(45) Date of Patent: Sep. 30, 2025

(54) METHOD FOR ADJUSTING AIRCRAFT CONTROLS

(71) Applicant: Airbus Operations SAS, Toulouse (FR)

(72) Inventors: Stéphane Delannoy, Toulouse (FR); José Torralba, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 54 days.

(21) Appl. No.: 18/455,884

(22) Filed: Aug. 25, 2023

(65) Prior Publication Data

US 2024/0077889 A1    Mar. 7, 2024

(30) Foreign Application Priority Data

Aug. 29, 2022    (FR) ........................ 2208631

(51) Int. Cl.
*G05D 1/00*    (2024.01)
*B64C 13/16*    (2006.01)

(52) U.S. Cl.
CPC ........... *G05D 1/0833* (2013.01); *B64C 13/16* (2013.01)

(58) Field of Classification Search
CPC ...... G05D 1/0833; G05D 1/606; G05D 1/646; G05D 2109/22; B64C 13/16
See application file for complete search history.

(56) References Cited

U.S. PATENT DOCUMENTS

| 11,029,709 | B1 * | 6/2021 | Stepanyan | G05D 1/1062 |
| 2008/0046137 | A1 * | 2/2008 | Shue | G05D 1/0623 701/10 |
| 2016/0023776 | A1 | 1/2016 | Ganguli et al. | |

FOREIGN PATENT DOCUMENTS

| RU | 2377159 C1 * | 12/2009 | ............ B64C 13/16 |
| RU | 2713585 C1 * | 2/2020 | |

OTHER PUBLICATIONS

Espacenet machine translation of RU2377159C1 Kolomer (Year: 2009).*
Espacenet machine translation of RU2713585C1 Manokhin (Year: 2020).*
French Search Report for corresponding French Patent Application No. 2208631 dated Feb. 19, 2023; priority document.
(Continued)

*Primary Examiner* — Kito R Robinson
*Assistant Examiner* — Zachary E. F. Glade
(74) *Attorney, Agent, or Firm* — Greer, Burns & Crain, Ltd.

(57) ABSTRACT

A system for controlling aircraft flight control surfaces implements a method including: obtaining a control law for the flight control surfaces as a function of flight controls of the aircraft; obtaining measurements of ground speed, true speed, roll angle, pitch angle, angle of attack, sideslip angle and slope angle; performing an estimation of the wind in three dimensions using the measurements obtained; performing an adjustment of the control law for the flight control surfaces, to counter the estimated wind effect and to obtain an adjusted control law for the flight control surfaces, by adding, to the control law, a term for wind compensation comprising a term proportional to the derivative of the wind estimation; and controlling the aircraft by applying the adjusted control law. Thus, the impact of the wind on the aircraft is reduced by digital processing and automatic adjustment of the control of the flight control surfaces.

10 Claims, 2 Drawing Sheets

(56) References Cited

OTHER PUBLICATIONS

G. Perozzi et al., "On Sliding Mode Control Design for UAV Using Realistic Aerodynamic Coefficients" 2017 IEEE 56th Annual Conference on Decision and Control (CDC), IEEE, Dec. 12, 2017; pp. 5403-5408.
Jean-Luc Boiffier, "The Dynamics of Flight".

* cited by examiner

METHOD FOR ADJUSTING AIRCRAFT CONTROLS

CROSS-REFERENCES TO RELATED APPLICATIONS

This application claims the benefit of the French patent application No. 2208631 filed on Aug. 29, 2022, the entire disclosures of which are incorporated herein by way of reference.

FIELD OF THE INVENTION

The present invention relates to the field of the adjustment of aircraft controls in order to take into account an impact of wind on the aircraft in flight.

BACKGROUND OF THE INVENTION

When an aircraft is in flight, the wind leads to deviations of the flight path of the aircraft with respect to a desired flight path, referred to as reference flight path. In addition, notably due to turbulence, the wind has an impact on the flight path of the aircraft, or on the angular velocity of the aircraft, or on the attitude of the aircraft, or an impact of fatigue on the structure of the aircraft or other elements of the aircraft.

On modern aircraft, the flight controls are digital electrical flight controls, which allows the flight control surfaces of these aircraft to be adjusted by digital processing.

It is accordingly desirable to provide a solution which allows, automatically and by digital processing, the impact of the wind on the flight path of the aircraft and/or on the fatigue of the structure of the aircraft to be reduced.

SUMMARY OF THE INVENTION

For this purpose, a method is provided for controlling the flight control surfaces of an aircraft, the method being implemented by a system for controlling the flight control surfaces of the aircraft in the form of electronic circuitry and comprising the following steps: obtaining a control law for the flight control surfaces ui as a function of flight controls of the aircraft; obtaining measurements of ground speed VGND of the aircraft, of true speed VTAS of the aircraft, of roll angle $\varphi$ of the aircraft, of pitch angle $\theta$ of the aircraft, of angle of attack $\alpha$ of the aircraft, of sideslip angle $\beta$ of the aircraft, and of slope angle $\gamma$ of the aircraft; performing an estimation of the wind V in three dimensions using the measurements obtained; performing an adjustment of the control law for the flight control surfaces ui, in order to counter the estimated effect of the wind, and thus obtain an adjusted control law for the flight control surfaces ua, by adding, to the control law for the flight control surfaces ui, a term for compensation of the wind uw comprising a term proportional to the derivative $\dot{V}$ of the wind estimation V; and controlling the aircraft by applying the adjusted control law ua. Thus, the impact of the wind on the aircraft is reduced by digital processing and automatic adjustment of the control of the flight control surfaces of the aircraft.

In one particular embodiment:

$$u_w = -inv(CB)CM\dot{V}$$

where $C, B$ and $M$ are matrices defined by $$\dot{x} = Ax + B(u_w + u_i) + M\dot{V}$$

with:

$$y = Cx = \frac{C}{s}\dot{x}$$

where:
x represents the current state of the aircraft in the form of vectors, defined by aeronautical parameters having an influence on the stability of the aircraft,
$\dot{x}$ represents the state of the aircraft after application of the control law for the flight control surfaces, here the control law for the flight control surfaces ua,
y represents excursions of the aircraft on which the impact of the wind is to be minimized,
A, B and C represent state matrices of the aircraft reproducing the dynamic behavior of its movement,
s represents the Laplace operator, and
M is a transfer matrix for the wind V.

In one particular embodiment, the adjusted control law for the flight control surfaces ua is obtained by further adding, to the control law for the flight control surfaces ui, a term proportional to the integral of the derivative $\dot{V}$ of the wind estimation V.

More particularly, the aircraft is modelled with a filter of the first order of constant $\tau$, and $$\begin{cases} K_i = -1 \\ K = -\tau \end{cases}$$

where $K_i$ is a multiplier coefficient of the proportional term of the integral of the derivative $\dot{V}$ of the wind estimation V and where K is a multiplier coefficient of the term proportional to the derivative $\dot{V}$ of the wind estimation V.

In one particular embodiment, the adjusted control law for the flight control surfaces ua is obtained by further adding, to the control law for the flight control surfaces ui, a term proportional to the second derivative $\ddot{V}$ of the wind estimation V.

More particularly, the aircraft is modelled with a filter of the second order having a damping $\xi_0$ and an angular frequency $\omega_0$, and:

$$\begin{cases} K_i = -1 \\ K = -\dfrac{2\xi_0}{\omega_0} \\ K_d = -\dfrac{1}{\omega_0^2} \end{cases}$$

where $K_i$ is a multiplier coefficient of the term proportional to the integral of the derivative $\dot{V}$ of the wind estimation V, where K is a multiplier coefficient of the term proportional to the derivative $\dot{V}$ of the wind estimation V and where $K_d$ is a multiplier coefficient of the term proportional to the second derivative $\ddot{V}$ of the wind estimation V.

A computer program product is also provided, comprising instructions causing execution, by a processor, of the method according to any one of the embodiments described hereinabove, when said instructions are executed by the processor. A storage medium is also provided, storing a computer program comprising instructions causing execution, by a processor, of the method according to any one of the embodiments described hereinabove, when said instructions are read and executed by the processor.

A system for controlling flight control surfaces of an aircraft is also provided in the form of electronic circuitry configured for implementing the following steps: obtaining a control law for the flight control surfaces ui as a function of flight controls of the aircraft; obtaining measurements of ground speed VGND of the aircraft, of true speed VTAS of the aircraft, of roll angle φ of the aircraft, of pitch angle θ of the aircraft, of angle of attack α of the aircraft, of sideslip angle β of the aircraft, and of slope angle γ of the aircraft; performing an estimation of the wind V in three dimensions using the measurements obtained; performing an adjustment of the control law for the flight control surfaces ui, in order to counter the effect of the estimated wind, and thus to obtain an adjusted control law for the flight control surfaces ua, by adding, to the control law for the flight control surfaces ui, a term for compensation of the wind uw comprising a term proportional to the derivative $\dot{V}$ of the wind estimation V; and controlling the aircraft by applying the adjusted control law ua.

An aircraft is also provided comprising a control system for flight control surfaces such as described hereinabove.

BRIEF DESCRIPTION OF THE DRAWINGS

The features of the invention mentioned hereinabove, together with others, will become more clearly apparent upon reading the following description of at least one exemplary embodiment, the said description being presented in relation with the appended drawings, amongst which.

DETAILED DESCRIPTION OF THE PREFERRED EMBODIMENTS

Figure 1:
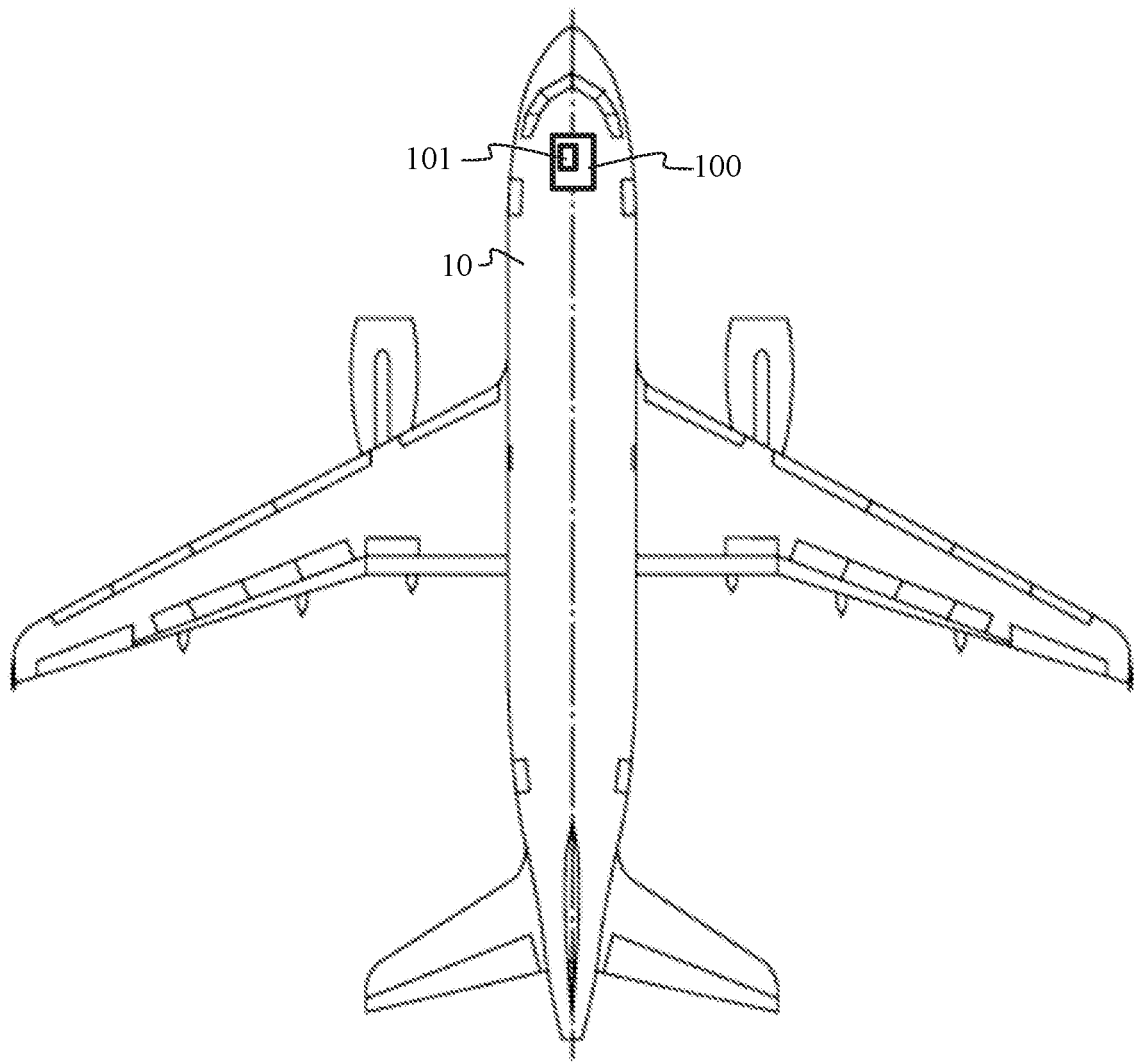
FIG. 1 illustrates schematically, as a top view, an aircraft equipped with a system for controlling the flight control surfaces of the aircraft comprising a sub-system for adjusting a control law of the aircraft.

FIG. 1 thus illustrates schematically, as a top view, an aircraft 10. The aircraft 10 comprises a system 100 for controlling the flight control surfaces of the aircraft 10 (elevators, ailerons, rudder). The system 100 applies a control law for the flight control surfaces (deflection commands) of the aircraft 10 as a function of flight controls of the aircraft 10.

The system 100 for controlling the flight control surfaces of the aircraft 10 comprises a sub-system 101 for adjusting the control law of the aircraft 10 as a function of an estimation of the wind to which the aircraft 10 is subjected in flight.

Conventionally, the aircraft 10 comprises sensors (not shown in FIG. 1) and electronic control circuitry, designed and configured for supplying measurements of speed and of orientation of the aircraft 10. By virtue of these measurements, the sub-system 101 for adjusting the control law of the aircraft 10 is able to carry out an estimation of the wind in three dimensions, in a right orthonormal reference frame (xb, yb, zb) fixed with respect to the center of gravity of the aircraft 10 (with xb oriented towards the front of the aircraft 10 and yb oriented towards the left of the aircraft 10), in the following manner:

$$V = \begin{bmatrix} -V_{GND}\tan(\gamma) \\ -V_{TAS}(\sin(\theta)\cos(\beta)\cos(\alpha) - \\ \cos(\theta)\cos(\varphi)\cos(\beta)\sin(\alpha) - \sin(\beta)\cos(\theta)\sin(\varphi))) \\ V_{GND}\tan(\gamma) - V_{TAS}(\sin(\theta)\cos(\beta)\cos(\alpha) - \\ \cos(\theta)\cos(\varphi)\cos(\beta)\sin(\alpha) + \sin(\beta)\cos(\theta)\sin(\varphi))) \end{bmatrix} \quad [\text{MATH. 1}]$$

where:

VGND represents the ground speed (horizontal speed of the aircraft 10 with respect to the surface of the Earth), VTAS represents the true speed of the aircraft 10 (speed of the aircraft with respect to the mass of air through which the aircraft is flying), φ represents the roll angle of the aircraft 10, such as supplied by the IRS (Inertial Reference System), θ represents the pitch angle of the aircraft 10, such as supplied by the inertial reference system IRS, α represents the angle of attack of the aircraft 10, such as supplied by the ADIRS (Air Data Inertial Reference System), β represents the sideslip angle of the aircraft 10, such as supplied by the air data inertial reference system ADIRS, and γ represents the slope angle of the aircraft 10, such as supplied by the ADIRS (Air Data Inertial Reference System).

As disclosed hereinafter, the sub-system 101 for adjusting the control law of the aircraft 10 comprises electronic circuitry designed and configured for carrying out a real-time estimation of the wind such as expressed hereinabove, in order to adjust a control law for flight control surfaces so as to reduce the impact of the wind on the aircraft 10.

Figure 2:
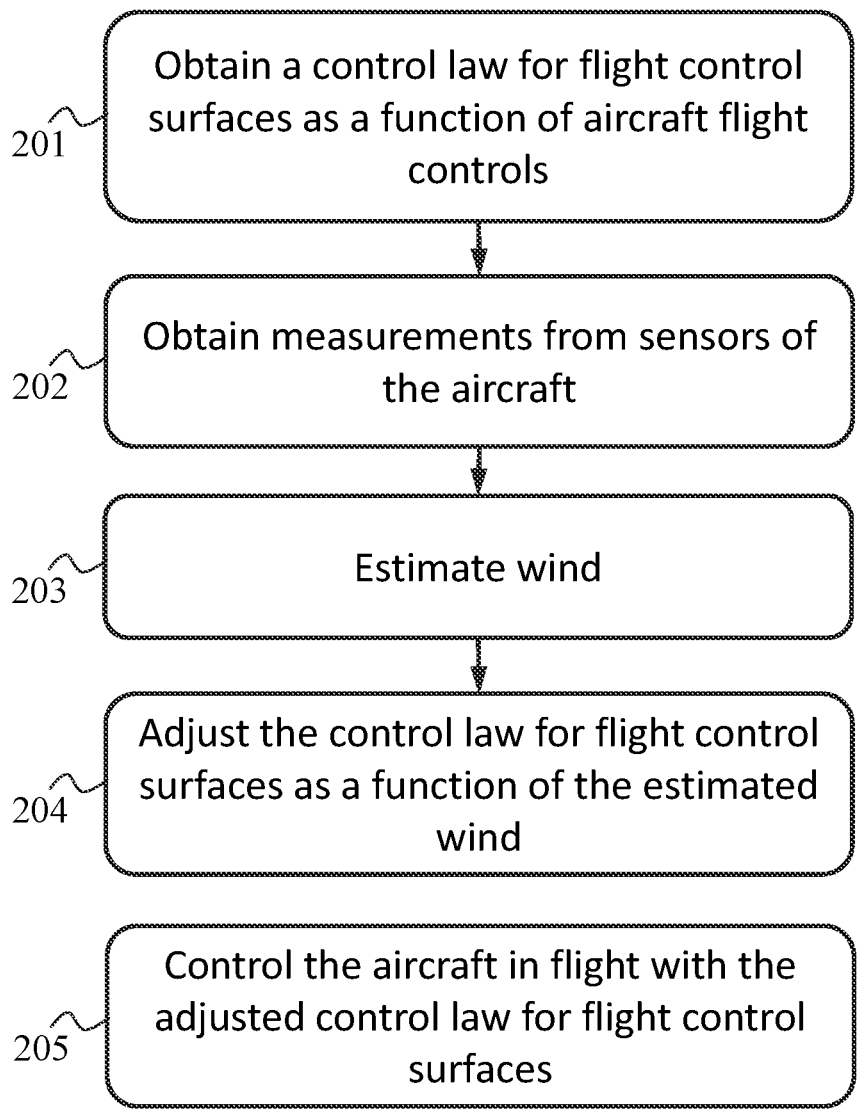
FIG. 2 illustrates schematically a flow diagram of a method for controlling the aircraft in flight aimed at reducing the impact of the wind on the aircraft.

FIG. 2 illustrates schematically a method for controlling the aircraft 10 in flight aimed at reducing the impact of the wind on the aircraft 10.

In a step 201, the system 100 for controlling the flight control surfaces of the aircraft 10 obtains a control law for the flight control surfaces ui as a function of flight controls of the aircraft 10. The flight controls are actuated by the pilot, or by an autopilot system, for maneuvering the aircraft 10 in flight. The control law for the flight control surfaces ui, obtained at the step 201, does not take into account the estimation of the wind.

In a step 202, the system 100 for controlling the flight control surfaces of the aircraft 10 obtains measurements of speed and of orientation of the aircraft 10 useful for the estimation of the wind, in real time. More particularly, the system 100 for controlling the flight control surfaces of the aircraft 10 obtains measurements of the ground speed VGND and of the true speed VTAS. The system 100 for controlling the flight control surfaces of the aircraft 10 further obtains the roll angle φ and the pitch angle θ, together with the angle of attack α, the sideslip angle β and the slope angle γ.

In a step 203, the sub-system 101 for adjusting the control law of the aircraft 10 carries out an estimation of the wind, as already described hereinabove. The sub-system 101 for adjusting the control law of the aircraft 10 tracks the estimation of the wind over time.

In a step 204, the sub-system 101 for adjusting the control law of the aircraft 10 carries out an adjustment of the control law for the flight control surfaces ui obtained at the step 201, in order to counter the effect of the wind such as estimated at the step 203, and thus obtains an adjusted control law for the flight control surfaces ua.

In order to obtain the adjusted control law for the flight control surfaces ua, the sub-system 101 for adjusting the control law of the aircraft 10 adds, to the control law for the flight control surfaces ui obtained at the step 201, a term for compensation of the wind uw. More precisely, the term for compensation of the wind uw comprises a term proportional to the derivative V̇ of the wind estimation V from the step 203, and thus:

$$u_a = u_i + u_w = u_i + K\dot{V}$$

where K is a predetermined coefficient.

In one particular embodiment, the term for compensation of the wind uw further comprises a term proportional to the integral of the derivative V̇ of the wind estimation V from the step 203, and thus:

$$u_a = u_i + u_w = u_i + K\dot{V} + K_i \int \dot{V}$$

where $K_i$ is a predetermined coefficient.

In one particular embodiment, the term for compensation of the wind uw further comprises a term proportional to the second derivative V̈ of the wind estimation V from the step 203, and thus:

$$u_a = u_i + u_w = u_i + K\dot{V} + K_i \int \dot{V} + K_d \ddot{V}$$

where $K_d$ is a predetermined coefficient.

First Method

In a first method, the aircraft 10 is modelled by a representation of states defined, for a non-rigid aircraft aero-elastic model (taking into account elastic deformations due to the coupling between structural modes and aerodynamic forces), by:

$$\dot{x} = Ax + Bu_i$$
$$y = Cx = \frac{C}{s}\dot{x}$$

where:
- x represents, in the form of vectors, the current state of the aircraft 10, defined by aeronautical parameters having an influence on the stability of the aircraft 10, typically [α q $V_{TAS}$ θ] on the longitudinal axis xb and [β r p φ] jointly on the yaw and roll axes, where q represents the pitching speed, r represents the yawing speed and p represents the rolling speed,
- ẋ represents the state of the aircraft 10 after application of the control law for the flight control surfaces, here the control law for the flight control surfaces ui,
- y represents excursions of the aircraft 10 on which the impact of the wind is to be minimized (for example, an angular velocity, or an attitude, or a structural fatigue criterion or for any modellable element of the aircraft 10, etc.),
- A, B and C represent matrices of state of the aircraft 10 reproducing the dynamic behavior of its movement.
- s represents the Laplace operator.

In summary, the new state ẋ of the aircraft 10 obtained by applying the control law for the flight control surfaces ui depends on the current state x of the aircraft 10 and on the control law for the flight control surfaces ui.

The matrices A, B and C are obtained by applying the equations of mechanics for the flight of the aircraft 10. Such a modelling is for example described in "The dynamics of flight" by Jean-Luc Boiffier. In this work, the matrices A, B and C are obtained from functions F(X,U) as described on page 135 and the following pages. A linearization of the matrices is subsequently carried out, as described on page 158. Such a modelling is also for example described in section 2.2 of the document "Méthodologie de conception de lois de pilotage multiobjectifs autoséquencées pour un avion de transport civil souple" ("Methodology for designing autosequenced multi-objective flight control laws for a non-rigid commercial transport airplane"), José TORRALBA, 2011, ONERA, University of Toulouse.

Thus, in order to take into account the effect of the wind, it is possible to derive the model in the following manner:

$$\dot{x} = Ax + Bu_a + M\dot{V} = Ax + B(u_w + u_i) + M\dot{V}$$

still with:

$$y = Cx = \frac{C}{s}\dot{x}$$

where M is a transfer matrix for the wind, in other words a matrix for estimating the effect of the wind on the states of the model.

The matrix M is obtained either analytically or by simulation, for example by simulation with a complete aircraft simulator, where, by knowing x, ẋ, and ui, and the derivative of the wind V̇, it is possible to accordingly deduce the content of the matrix M by calculation.

In summary, the new state ẋ of the aircraft 10 associated with the compensation term uw depends on the current state x of the aircraft 10 and on the compensation term uw.

In order to cancel the effect of the wind on the fatigue of the structure of the aircraft 10, the following equation must be validated:

$$CBu_w + CM\dot{V} = 0$$

Accordingly, in order to compensate the effect of the wind on the fatigue of the structure of the aircraft 10, the sub-system 101 for adjusting the control law of the aircraft 10 calculates the term for compensation of the wind $u_W$ in the following manner:

$$u_w = -inv(CB)CM\,\dot{V}$$

Thus, in the embodiment where $$u_a = u_i + u_w = u_i + K\dot{V}$$

this leads to $$K = -inv(CB)CM$$

Second Method

In a second method, the aircraft 10 is modelled by a filter of the first order, with a constant τ, or of the second order, with a damping ξ0 and an angular frequency ω0. The constant r, just like the damping ξ0 and the angular frequency ω0, are dynamic characteristics obtained by virtue of a simulator. The first or second order corresponds to more or less accurate modelling of the aircraft 10. The second order will be more accurate than the first order. The choice between first order and second order is made depending on a desired accuracy.

It is possible to model the adjusted control law for the flight control surfaces ua in the following manner:

$$u_a = \frac{K_{i\_ui}}{s}(y_c - y_{mes}) + K_{p\_ui}y_{mes} + K_i \delta y + K\dot{\delta y} + K_d \ddot{\delta y}$$

where:
- $y_c$ represents the setpoint for the closed-loop control (for example, the attitude or the pitching angular velocity)
- $y_{mes}$ represents the measurement of the parameter being controlled, such as the attitude or the pitching angular velocity. It should be noted that $y_{mes}$ comprises the contribution of the pilot to the parameter being controlled, together with the contribution of the wind V.
- $K_{i\_ui}$ and $K_{p\_ui}$ are predetermined coefficients relating to the control law for the flight control surfaces ui obtained at the step 201, such that:

$$u_i = \frac{K_{i\_ui}}{s}$$

The coefficients $K_{i\_ui}$ and $K_{p\_ui}$ may be determined by placement of poles of a closed-loop system according to a method of control by full-state feedback, such as is, for example, addressed in the following link: https://fr.wikipedia.org/wiki/Commande_par_retour_d %27% C3% A9tat By considering the control of the flight control surfaces of the aircraft 10 as a closed-loop system, the sub-system 101 for adjusting the control law of the aircraft 10 calculates a feedback aimed at cancelling the impact of the wind V on the aircraft 10. The modelling of the closed-loop system comprises a first term which depends on the setpoint, typically the controlled vertical load factor Nzc, and a second term which depends on the wind V, called "sensitivity function" in control theory. The expression of this sensitivity function may be obtained analytically. The sensitivity function is expressed in the form of a numerator and a denominator. The denominator is for example determined by a conventional method by placement of poles, and the sub-system 101 for adjusting the control law of the aircraft 10 tries to cancel the numerator in order to cancel the effect of the wind V.

Thus, in the embodiment where $$u_a = u_i + u_w = u_i + K\dot{V} + K_d \ddot{V} + K_d \ddot{V}$$

it turns out that, with a filter of the first order, the coefficients are fixed in the following manner:

$$\begin{cases} K_i = -1 \\ K = -\tau \\ K_d = 0 \end{cases}$$

which cancels the term proportional to the second derivative $\ddot{V}$ of the wind estimation V, and, with a filter of the second order, the coefficients are fixed in the following manner:

$$\begin{cases} K_i = -1 \\ K = -\dfrac{2\xi_0}{\omega_0} \\ K_d = -\dfrac{1}{\omega_0^2} \end{cases}$$

In a step 205, the system 100 for controlling the flight control surfaces of the aircraft 10 controls the aircraft 10 in flight with the adjusted control law for flight control surfaces $u_a$ obtained at the step 204. By applying the adjusted control law for flight control surfaces $u_a$ obtained at the step 204 (which takes the wind into account) rather than the control law for the flight control surfaces ui obtained at the step 201 (which does not take the wind into account), the impact of the wind on the aircraft 10 is thus minimized, which reduces the impact of the wind on the flight path of the aircraft and/or on the fatigue of the structure of the aircraft.

Figure 3:
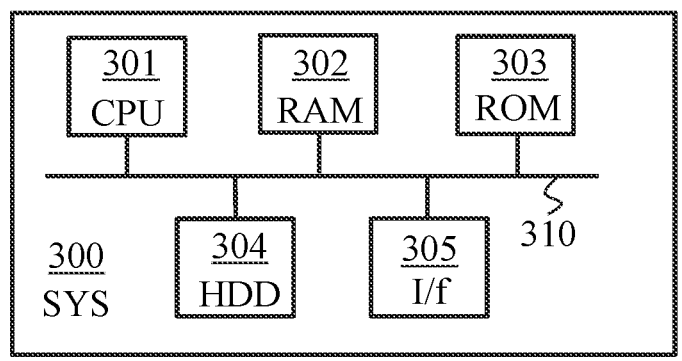
FIG. 3 illustrates schematically one example of a hardware platform designed and configured for implementing the sub-system for adjusting a control law of the aircraft.

FIG. 3 illustrates schematically one example of a hardware platform 300, in the form of electronic circuitry, which is designed and configured for implementing all or part of the system 100 for controlling the flight control surfaces of the aircraft 10, and more particularly the sub-system 101 for adjusting the control law of the aircraft 10.

The hardware platform thus comprises, linked via a communications bus 310: a processor or CPU (Central Processing Unit) 301; a volatile memory RAM (Random Access Memory) 302; a non-volatile memory 303, for example of the ROM (Read-Only Memory) type or EEPROM (Electrically-Erasable Programmable ROM); a storage unit 304, such as an HDD (Hard Disk Drive), or a storage medium reader, such as an SD (Secure Digital) card reader; and an interface manager I/f 305.

The interface manager I/f 305 allows an interaction with one or more devices of the aircraft 10, more particularly avionics equipment of the aircraft 10, in order to receive information useful for the estimation of the wind and for applying the adjusted control law to the control of the flight control surfaces of the aircraft 10.

The processor 301 is capable of executing instructions loaded into the volatile memory 302 from the non-volatile memory 303, from an external memory, from a storage medium (such as an SD card), or from a communications network. When the hardware platform is powered up, the processor 301 is capable of reading instructions from the volatile memory 302 and of executing them. These instructions form a computer program causing the implementation, by the processor 301, of all or part of the steps and operations described here.

All or part of the steps and operations described herein may thus be implemented in software form by execution of a set of instructions by a programmable machine, for example a processor of the DSP (Digital Signal Processor) type or a microcontroller, or be implemented in hardware form by a machine or a dedicated chip or a chipset, for example an FPGA (Field Programmable Gate Array) or ASIC (Application Specific Integrated Circuit) component. Generally speaking, the hardware platform comprises electronic circuitry designed and configured for implementing the operations and steps described herein.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for controlling flight control surfaces of an aircraft, the method being carried out by a system for controlling the flight control surfaces of the aircraft formed of electronic circuitry and comprising the following steps:

obtaining a control law for the flight control surfaces as a function of flight controls of the aircraft;

obtaining measurements of ground speed of the aircraft, of true speed of the aircraft, of roll angle of the aircraft, of pitch angle of the aircraft, of angle of attack of the aircraft, of sideslip angle of the aircraft, and of slope angle of the aircraft;

estimating a velocity of wind in three dimensions using the measurements obtained;

performing an adjustment of the control law for the flight control surfaces, in order to counter an estimated effect of the wind, and thus obtain an adjusted control law for the flight control surfaces by adding, to the control law for the flight control surfaces, a term for compensation of the wind comprising a term proportional to a derivative of the wind estimation; and controlling the aircraft by adjusting the flight controls to modify the flight control surfaces in response to the adjusted control law.

2. The method according to claim 1, wherein:

$$u_w = -inv(CB)CM\dot{V}$$

where $C, B$ and $M$ are matrices defined by $$\dot{x} = Ax + B(u_w + u_i) + M\dot{V}$$

with:

$$y = Cx = \frac{C}{s}\dot{x}$$

where $u_w$ represents the term for compensation of the wind estimation, $u_i$ represents the control law, $\dot{V}$ represents the term proportional to a derivative of the wind estimation, x represents, as vectors, a current state of the aircraft, defined by aeronautical parameters having an influence on a stability of the aircraft, $\dot{x}$ represents the state of the aircraft after application of the control law for the flight control surfaces, here the control law for the flight control surfaces, y represents excursions of the aircraft on which an impact of the wind is to be minimized, A, B and C represent matrices of state of the aircraft reproducing a dynamic behavior of its movement, s represents a Laplace operator, and M is a transfer matrix for the wind V.

3. The method according to claim 1, wherein the adjusted control law for the flight control surfaces is obtained by further adding, to the control law for the flight control surfaces, a term proportional to an integral of a derivative of the wind estimation.

4. The method according to claim 3, wherein the aircraft is modelled with a filter of a first order of constant $\tau$, and wherein $$\begin{cases} K_i = -1 \\ K = -\tau \end{cases}$$

where $K_i$ is a multiplier coefficient of the term proportional to the integral of the derivative of the wind estimation and where K is a multiplier coefficient of the term proportional to the derivative of the wind estimation.

5. The method according to claim 4, wherein the aircraft is modelled with a filter of a second order having a damping $\xi_0$ and an angular frequency $\omega_0$ and wherein:

$$\begin{cases} K_i = -1 \\ K = -\dfrac{2\xi_0}{\omega_0} \\ K_d = -\dfrac{1}{\omega_0^2} \end{cases}$$

where $K_i$ is a multiplier coefficient of the term proportional to the integral of the derivative of the wind estimation, where K is a multiplier coefficient of the term proportional to the derivative $\dot{V}$ of the wind estimation V and where $K_d$ is a multiplier coefficient of the term proportional to a second derivative of the wind estimation.

6. The method according to claim 3, wherein the adjusted control law for the flight control surfaces is obtained by further adding, to the control law for the flight control surfaces, a term proportional to a second derivative of the wind estimation.

7. A computing device having a non-volatile memory containing a computer program product, comprising instructions causing an execution, by a processor, of the method according to claim 1, when said instructions are executed by the processor.

8. A non-transitory memory storage medium, storing a computer program comprising instructions causing an execution, by a processor, of the method according to claim 1, when said instructions are read and executed by the processor.

9. A system for controlling flight control surfaces of an aircraft formed of electronic circuitry configured for implementing the following steps:

obtaining a control law for the flight control surfaces as a function of flight controls of the aircraft;

obtaining measurements of ground speed of the aircraft, of true speed of the aircraft, of roll angle of the aircraft, of pitch angle of the aircraft, of angle of attack of the aircraft, of sideslip angle of the aircraft, and of slope angle of the aircraft;

the electronic circuitry being configured for implementing the following steps:

estimating a velocity of wind in three dimensions using the measurements obtained;

performing an adjustment of the control law for the flight control surfaces, in order to counter an estimated effect of the wind, and thus obtain an adjusted control law for the flight control surfaces, by adding, to the control law for the flight control surfaces, a term for compensation of the wind comprising a term proportional to a derivative of the wind estimation; and controlling the aircraft by adjusting the flight controls to modify the flight control surfaces in response to the adjusted control law.

10. An aircraft comprising a control system of flight control surfaces according to claim 9.

* * * * *